Figure 1A:
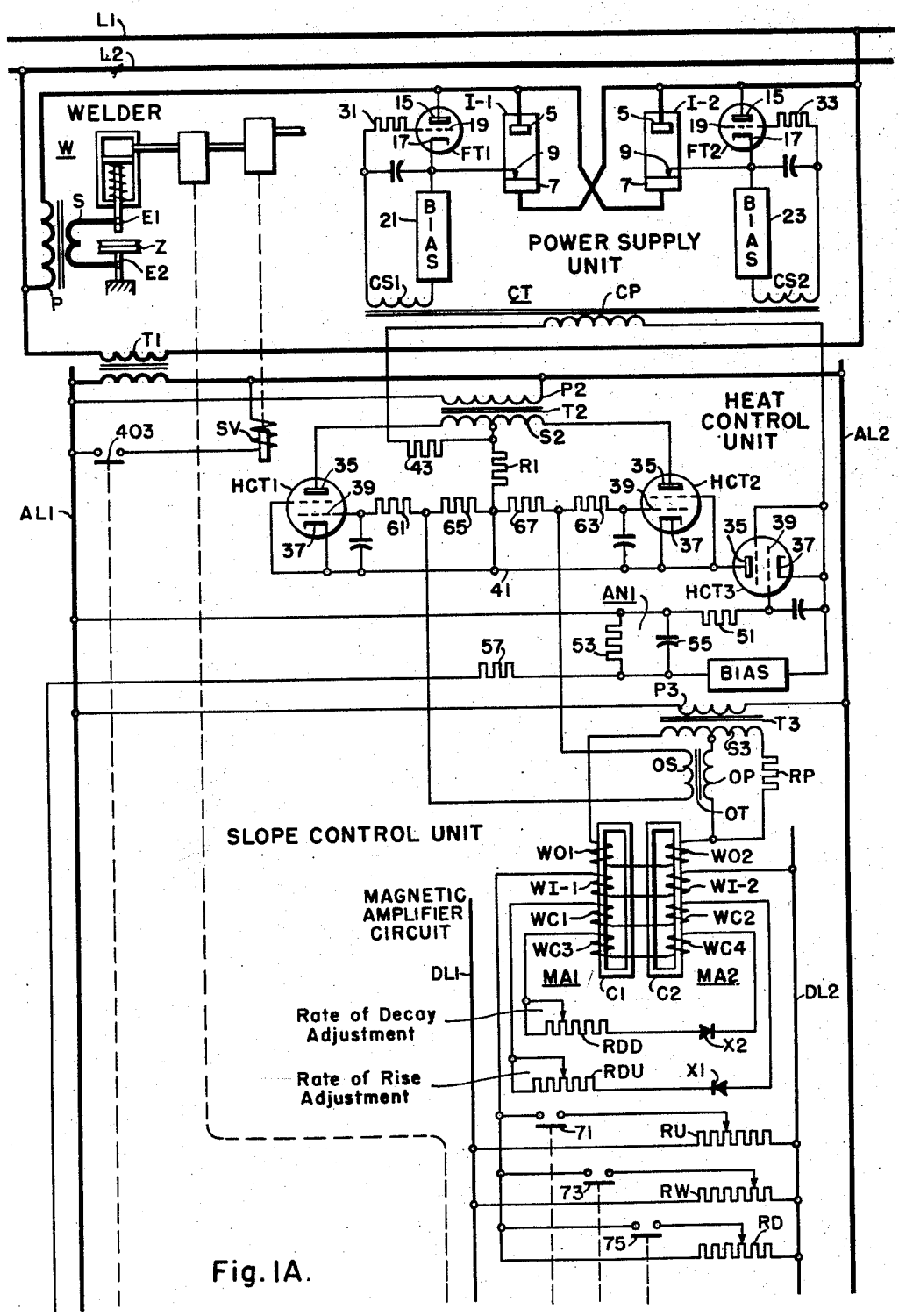

MAGNETIC AMPLIFIER CIRCUIT

United States Patent Office 2,892,148
Patented June 23, 1959

2,892,148

MAGNETIC AMPLIFIER CONTROL FOR ELECTRIC DISCHARGE APPARATUS

William E. Large, Lancaster, N.Y., and Edward C. Hartwig, Walnut Creek, Calif., assignors to Westinghouse Electric Corporation, East Pittsburgh, Pa., a corporation of Pennsylvania Application April 19, 1954, Serial No. 424,061

7 Claims. (Cl. 323—89)

Our invention relates to electric discharge apparatus and has particular relation to apparatus for controlling the supply of current for welding. This application concerns itself with precision electric resistance welding of the type discussed in application Serial No. 381,936, filed September 23, 1953, to William E. Large (hereinafter called "Large application"). The disclosure of the Large application is incorporated in this application by reference.

In the Large application, apparatus is disclosed for determining the waveform of current pulses supplied for welding and particularly for the welding of such material as aluminum and magnesium and their alloys. The welding pulses which are produced with the apparatus disclosed in the Large application are of composite waveform having a rise component, a weld component and a decay component. The apparatus disclosed in the Large application includes facilities for producing such composite pulses and for giving them any reasonable desired form.

While we have found apparatus disclosed by Large to operate satisfactorily, this apparatus is moderately complex, particularly in the portion which determines the welding pulse waveform and which includes three double triodes connected in a moderately involved circuit.

It is, accordingly, an object of our invention to provide welding apparatus of relatively simple structure particularly suitable for precision welding.

Another object of our invention is to provide welding apparatus including facilities of relatively simple structure for producing a welding pulse having any reasonable waveform over a wide range of waveforms predetermining the rise component, the weld component and the decay component of the pulse.

A more specific object of our invention is to provide a control circuit for controlling the duration and waveform of a current pulse which control circuit shall include facilities of simple structure for predetermining the waveform or the pulse setting the rate of rise, the maximum magnitude and the rate of decay of the pulses at any desired magnitude over a wide range.

Our invention arises from the realization that highly precise waveform control of the type described above may be achieved by including in the welding apparatus or in the control circuit for the welding apparatus transducers which are preferably magnetic amplifiers or saturable reactors. These reactors are so connected and so controlled as to provide facilities for varying the waveform of the output pulses of the apparatus over a wide range.

It is, accordingly, a specific object of our invention to provide a novel magnetic amplifier circuit particularly suitable for use in varying the waveform of a current pulse so that any desired waveform over a reasonable range may be attained.

In accordance with our invention, we provide welding apparatus including a Power Supply Unit, a Slope Control Unit, a Heat Control Unit and a Sequence Timer in which the Slope Control Unit includes magnetic amplifier or saturable reactor means for determining the waveform of the current supply by the Power Supply Unit. Specifically, the saturable reactor means includes output windings, input windings and control windings. Further means is provided for supplying control current to the input windings, which preferably, supplies direct current pulses. The control current supply means and the input windings of the reactor are connected to the weld timing component of the Sequence Timer in such manner that when the weld timing component is timing out, it selectively varies the control current supplied to the input windings at an appropriate instant in the weld time so as to assure that the current pulse has the desired starting magnitude, the desired maximum magnitude and the desired terminating magnitude. The output windings are connected to the Heat Control Unit and through it controls the Power Supply Unit so that the latter supplies current depending on the impedance of the output windings which in turn depends on the control current supplied to the input winding means.

The Slope Control Unit also includes first and second rectifier means and first and second variable impedance means. The first rectifier means and the first variable impedance means are connected in a closed network with one set of control windings, the rectifier means being poled so as to conduct the current induced in these control windings only when the current in the input windings is increased. The second rectifier means and the second variable impedance means are connected in other network with another set of control windings, the second rectifier means being poled to conduct the current which is induced in the latter control windings only when the current in the input windings is decreased. The decay of current in each of these networks determines the rate of rise of the current through the input windings when it is increased or decreased. Since this decay may be changed by changing the first and second variable impedance means, being at a high rate when the impedance means is high and at a low rate when the impedance means is low, the rate of rise and decay of the current in the input windings and the variation of the impedance of the output windings may be correspondingly determined by the magnitude of these variable impedances, and thus the rate of rise and decay of the load current may be set.

The novel magnetic amplifier circuit just disclosed in cooperation with the other components of the welding apparatus thus avails high precision welding apparatus by which the operation of the waveform of the welding pulses may be varied over a wide range.

Figure 1B:
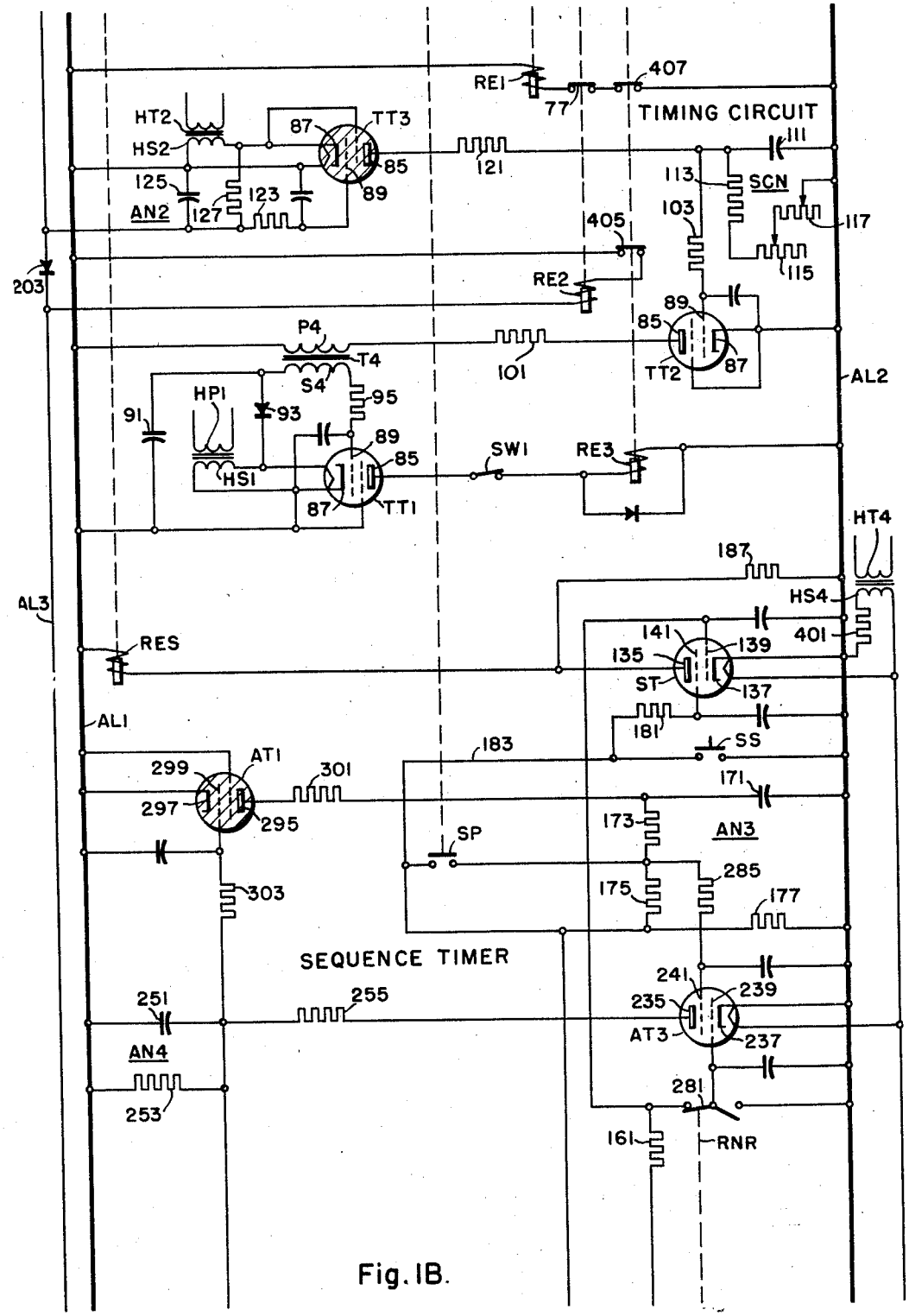
Figure 1C:
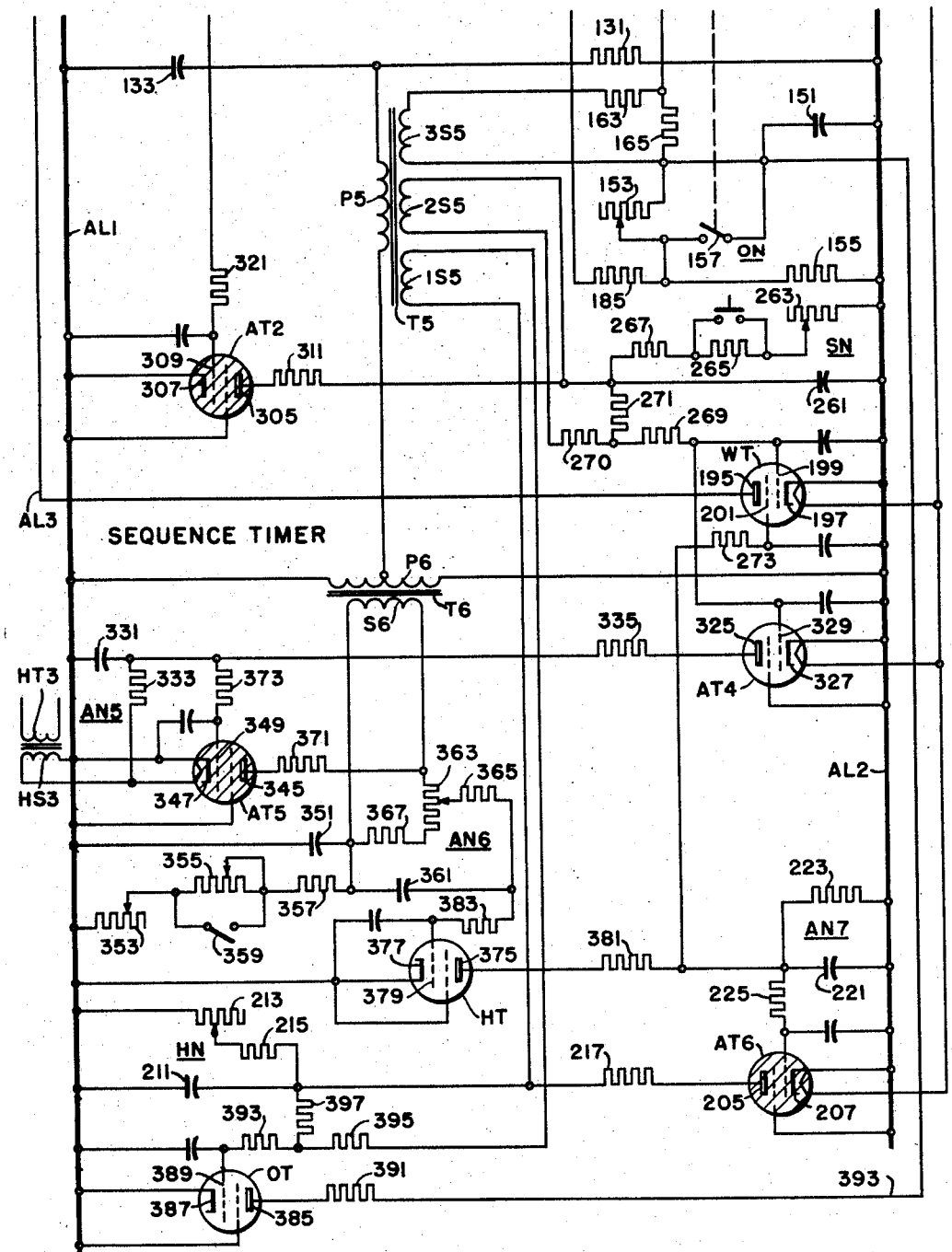
Figure 2:
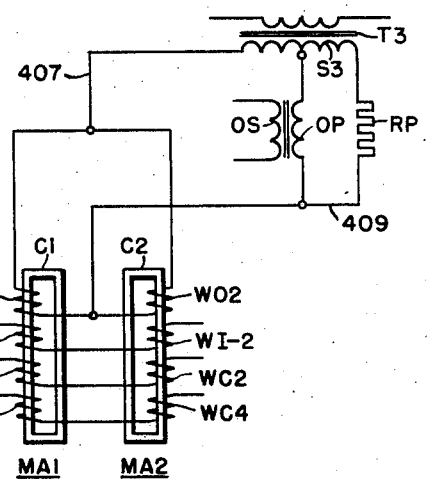
Figure 3:
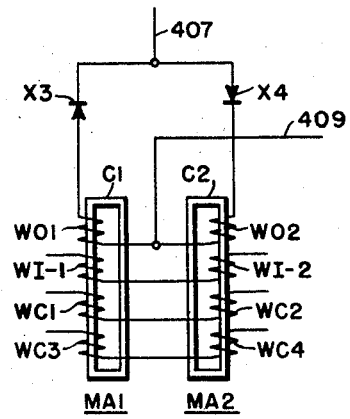
Figure 4:
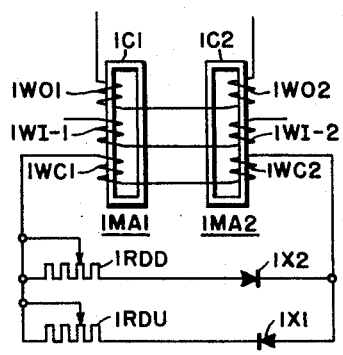

The novel features that we consider characteristic of our invention are set forth generally above. The invention itself both as to its organization and method of operation together with the additional objects and advantages thereof will be understood from the following description of specific embodiments when read in connection with the accompanying drawings, in which:

Figures 1A, 1B and 1C together are circuit diagrams of a preferred embodiment of our invention, and Figs. 2, 3 and 4 are diagrams showing the essential portions of circuits constituting modifications of our invention.

*Description*

The apparatus shown in Figs. 1A through 1C include a Welder, a Power Supply Unit, a Heat Control Unit, a Slope Control Unit and a Sequence Timer. This apparatus derives alternating current power from a pair of buses or conductors L1 and L2 which may be energized from the available commercial buses (not shown) of a supply of any available voltage such as 230, 440 550, 2300, or even higher. The Power Supply Unit is supplied directly from the buses L1 and L2. The Heat Control Unit, Slope Control Unit and the Sequence Timer are supplied from auxiliary buses or conductors AL1 and AL2 which ar energized through a transformer T1 from the main conductors L1 and L2. In addition, the Slope Control Unit includes buses or conductors DL1 and DL2 which supply control current. This control current is of the direct current type and preferably may be derived through a rectifier (not shown) of suitable structure from the conductors AL1 and AL2 or even directly from the buses L1 and L2.

The Welder includes a welding transformer W having a primary P and a secondary S. The secondary S is connected between the welding electrodes E1 and E2. The electrode E1 is movable relative to the electrode E2, and it is actuable by a pressure system shown diagrammatically. This pressure system includes a valve V which is closed when the apparatus is quiescent and is actuable by a solenoid SV to open and permit fluid to move the electrode E1 towards electrode E2 so that any work Z may be engaged. The Welder also includes a reservoir having a piston (not shown) for actuating a back pressure switch SP when adequate pressure is built up in the hydraulic system.

The Power Supply Unit includes valve means preferably consisting of a pair of ignitrons I–1 and I–2. Each of the ignitrons I–1 and I–2 has an anode 5, a cathode 7 and an ignitor 9. The ignitrons I–1 and I–2 are connected in anti-parallel between the conductors L1 and L2 and the primary P, the anode 5 of ignitron I–1 and the cathode 7 of ignitron I–2 being connected together to one terminal of primary P and the anode 5 of ignitron I–2 and the cathode 7 of ignitron I–1 being connected to the conductor L1 while the other terminal of primary P is connected to conductor L2.

A firing thyratron FT1 and FT2, respectively, is associated with each ignitron I–1 and I–2. Each firing thyratron FT1 and FT2 has an anode 15, a cathode 17 and a control electrode 19. The anodes 15 of the thyratrons FT1 and FT2 are respectively connected to the anodes 5 of the ignitrons I–1 and I–2. The cathodes 17 of the thyratrons FT1 and FT2 are respectively connected to the ignitors 9 of the ignitrons I–1 and I–2.

For controlling the firing of the ignitrons I–1 and I–2, a control transformer CT is provided. This transformer has a primary CP and a pair of secondaries CS1 and CS2. The secondaries are connected respectively between the control electrodes 19 and the cathodes 17 of the thyratrons FT1 and FT2 through a suitable bias 21 and 23, respectively, and through grid resistors 31 and 33, respectively. The bias 21 and 23 maintains the thyratrons FT1 and FT2 non-conducting on the quiescent condition of the apparatus. The primary CP is supplied from the Heat Control Unit.

The Heat Control Unit includes thyratrons HCT1, HCT2 and HCT3. Each of these thyratrons has an anode 35, a cathode 37 and a control electrode 39. The thyratrons HCT1, HCT2 and HCT3 are supplied with potential from the conductors AL1 and AL2 through a transformer T2 having a primary P2 connected to the conductors AL1 and AL2 and a secondary S2 having an intermediate tap. The anodes 35 of the thyratrons HCT1 and HCT2 are connected to the terminals of the secondary S2. The cathodes 37 of these latter thyratrons are connected together to a common conductor 41, which in turn is connected to the anode 35 of the thyratron HCT3. The cathode 37 of the thyratron HCT3 is connected to the intermediate tap of secondary S2 through the primary CP of transformer CT and through a current limiting resistor 43. There are, thus, in effect two parallel circuits including one or the other of the thyratrons HCT1 or HCT2; to these parallel circuits thyratron HCT3 and the primary CP are common. Thyratron HCT3 conducts in series with thyratron HCT1 or thyratron HCT2. A resistor R1 is connected between the intermediate tap or the secondary S2 and the conductor 41. This resistor balances the anode voltages impressed on thyratrons HCT1 and HCT2.

The control electrode 39 of thyratron HCT3 is connected to the cathode 37 of this thyratron through a grid resistor 51, a time constant network AN1 and a blocking bias. The network includes a resistor 53 in parallel with a capacitor 55 and has, preferably, a time constant of the order of one period of the potential supplied by the conductors L1 and L2. The bias is adequate to block the conduction of thyratron HCT3 when the network AN1 is uncharged. The network AN1 is supplied from the Sequence Timer through a resistor 57. In the absence of charge on the network AN1, the thyratron HCT3 being non-conducting prevents the conduction of either of the thyratrons HCT1 or HCT2 and thus prevents the current flow through the primary CP. Under these circumstances, the biases 21 and 23 maintain the thyratrons FT1 and FT2 non-conducting.

The control electrodes 39 of the thyratrons HCT1 and HCT2 are connected to the cathode 37, each through a grid resistor 61 and 63 and another resistor 65 and 67. Between each of the resistors 65 and 67, respectively, and the common conductor 41, firing potential for the thyratrons HCT1 and HCT2 is supplied from the Slope Control Unit. This firing potential is effective to fire the thyratrons HCT1 and HCT2 at selected instants in the periods of the supply. The instants being so selected that the proper waveform for the welding current is achieved.

The Slope Control Unit includes a Magnetic Amplifier Circuit and a Timing Circuit. The Magnetic Amplifier Circuit includes a pair of magnetic amplifiers MA1 and MA2. Each amplifier MA1 and MA2 includes a saturable core C1 and C2, an input winding WI–1 and WI–2, an output winding WO1 and WO2 and a pair of control windings WC1 and WC2 and WC3 and WC4.

The magnetic amplifier circuit also includes a transformer T3 having a primary P3 supplied from the conductors AL1 and AL2 and a secondary S3 having an intermediate tap. The output windings WO1 and WO2 are connected in series with the secondary S3 through a resistor RP. The alternating potential from the secondary S3 flows through the windings WO1 and WO2. The effect of this alternating potential on windings WI–1 and WI–2 must be considered in connecting the latter. The resistor RP has a resistance which is of the same general order as the reactive impedance or inductive reactance of the windings WO1 and WO2. Thus, the potential impressed between the intermediate tap of the secondary S3 and the junction of the resistor RP and the winding WO2 is displaced in phase with reference to the potential between the conductors AL1 and AL2 by an angle depending on the impedance of the windings WO1 and WO2.

This potential is derived through an output transformer OT having a primary OP and a secondary OS. The primary OP is connected between the intermediate tap and the junction of the resistor RP and the winding WO2. The secondary OS is connected across the resistors 65 and 67 in the Heat Control Unit. A potential displaced in phase with reference to the anode potentials impressed on the thyratrons HCT1 and HCT2 by a magnitude depending on the impedance of the winding WO1 and WO2 is thus impressed in the control circuits, respectively, of the thyratrons HCT1 and HCT2. This control potential derived from the secondary OS lags the corresponding anode potential of the thyratrons HCT1 and HCT2 in phase by an amount depending on the impedance of the windings WO1 and WO2. The instant when the thyratrons HCT1 and HCT2 are fired is determined by this angle of lag.

The input windings WI–1 and WI–2 are supplied from the conductors DL1 and DL2 through variable resistors RU, RW and RD which may be selectively connected between the buses DL1 and DL2 and the windings WI-1 and WI-2 at different instants in the weld interval in accordance with the operation of a plurality of relays RE1, RE2 and RE3. Resistor RU, depending on its magnitude, sets the magnitude at which the rise component of the welding pulse starts; resistor RW similarly sets the magnitude of the weld component of the welding pulse; and resistor RD sets the final magnitude of the decay component of the welding pulse. Relay RE1 has a normally open contact 71; relay RE2, a normally open contact 73 and a normally closed contact 77 and relay RE3 a normally open contact 75 and normally closed contacts 405 and 407. The resistors RU, RW and RD are adapted to be connected in series with the windings WI-1 and WI-2 through the normally open contacts 71, 73 and 75 of the relays RE1, RE2 and RE3 depending on the actuation of these relays. The windings WI-1 and WI-2 are connected opposing in these series circuits in such manner that any alternating potential induced in them from the output windings WO1 and WO2, respectively, is balanced out in the series circuit. The coil of relay RE1 is connected in series with normally closed contact 77 and normally closed contact 407 the conductors AL1 and AL2. The coil of relay RE2 is connected between conductor AL1 and a conductor AL3 of the Sequence Timer, which supplies the signal from the weld timing component or the Sequence Timer, the contact 405.

The control windings WC1 and WC2 are connected in a closed network with a variable resistor RDU and a rectifier X1. The control windings WC3 and WC4 are connected in series with a variable resistor RDD and a rectifier X2. The windings WC1 and WC2 and WC3 and WC4, respectively, are connected in series opposing so that any potential induced in these windings by the alternating potential flowing through the output windings WO1 and WO2 is balanced out. Potential is also induced in the windings WC1 and WC2 and WC3 and WC4 when the current flow through the input windings WI-1 and WI-2 changes from a lower magnitude to a higher magnitude as occurs during the rise component of the welding pulse and from a higher magnitude to a lower magnitude as occurs during the decay component of the welding pulse. These induced potentials are of one polarity during the rise component and of the opposite polarity during the decay component. In each case, these induced potentials are not balanced out in the windings WC1 and WC2 and WC3 and WC4 because while these windings are connected opposing, the potential is derived from windings WI-1 and WI-2 also connected opposing. Thus, potentials of opposite polarity arising from the change in current flow through windings WI-1 and WI-2 appear across the windings WC1 and WC2 aiding during the rise component of the weld impulse and across WC3 and WC4 aiding during the decay component of the welding pulse, respectively. The rectifier X1 is connected to conduct the current flowing under this induced potential of the polarity occurring during the rise component of the welding pulse, and the rectifier X2 is connected to conduct the current flowing under the induced potential of the polarity occurring during the decay component. The resistors RDU and RDD, respectively, determine the time taken for the current arising from these induced potentials to decay. If these resistors are very low, this time is long, and if they are high, this time is short. Since these induced currents, in turn, determine the rate of decay in flux in the cores C1 and C2, they determine the rate of rise and decay of the rise components and decay components of the welding pulse.

The impedance of the output winding WO1 and WO2 of the magnetic amplifiers MA1 and MA2 depends on the direct current supplied to the input windings WI-1 and WI-2. This, in turn, depends on the setting of the resistors RU, RW, and RD and the operation of the contacts 71, 73 and 75. Thus, the phase angle of the potential derived from the secondary OS which determines the angle of the firing of the thyratron HCT1 and HCT2 and which depends on the relationship between the resistors RD and the reactance WO1 and WO2 is, in turn, dependent on the setting of the various resistors RU, RW and RD and on their connection to the windings WI-1 and WI-2. By properly setting these resistors and by properly determining when they are connected in the circuit, the durations of the rise component and the decay component of a welding pulse may be set. In addition, by properly setting the resistors RDU and RDD, the rate of rise of the rise component and the rate of decay of the decay component may be set.

The Timing Circuit includes three thyratrons TT1, TT2 and TT3. Each of these thyratrons has an anode 85, a cathode 87 and a control electrode 89.

The anode 85 of the thyratron TT1 is connected through a manual switch SW1, which when open serves to turn the Slope Control Unit off, and through the coil of the relay RE3 to the conductor AL2. The cathode 87 is connected directly to the conductor AL1. A blocking bias is supplied between the control electrode 89 and the cathode 87 by a capacitor 91 which is charged through a rectifier 93 from the secondary HS1 of the cathode-heating transformer HT1 for the thyratron TT1. This blocking bias in the quiescent condition of the apparatus maintains a thyratron TT1 non-conducting. The blocking bias may be counteracted by potential derived from a transformer T4 having a primary P4 and a secondary S4. The secondary S4 is connected between the control electrode 89 and the cathode 87 of the thyratron TT1 through a grid resistor 95 and the capacitor 91. The primary P4 is connected to the anode 85 of the thyratron TT2 through a current limiting resistor 101 and to the conductor AL1. The cathode 87 of the thyratron TT2 is connected to the conductor AL2. Current is thus supplied to the primary P4 when thyratron TT2 is conducting. The control electrode 89 of the thyratron TT2 is connected to its cathode 87 through a grid resistor 103 and through a time-constant network SCN. The network SCN includes a capacitor 111 shunted by a fixed resistor 113 and a pair of variable resistors 115 and 117.

The anode 85 of the thyratron TT3 is connected to the conductor AL2 through a current limiting resistor 121 and the network SCN. The cathode 87 of the thyratron TT3 is connected to the conductor AL1. The control electrode 89 of the thyratron TT3 is connected through a grid resistor 123 and the time constant network AN2 to the cathode. The network AN2 includes a capacitor 125 shunted by a resistor 127 and the secondary HS2 of the heater transformer HT2 which supplies heating current to the cathode 87 of the thyratron TT3. The secondary HS2 introduces a ripple in the network AN2 which is impressed in the control circuit of the thyratron TT3 displaced in phase with reference to the anode cathode potential of the thyratron. This ripple lags the anode cathode potential in phase and assures that the thyratron TT3 is not fired at the beginning of the positive half-period of the anode cathode potential impressed on it.

The exciting coil of the relay RE2 which controls the operation of the Slope Control Unit is supplied with current from the Sequence Timer through the conductor AL3. The coil is connected between this conductor AL3 and the conductor AL1 through normally closed contacts 405 of relay RE3.

The Sequence Timer includes a squeeze thyratron ST, a weld thyratron WT, a hold thyratron HT and an off thyratron OT. When the operation of the Sequence Timer is initiated, these thyratrons operate in sequence to initiate the squeeze, weld, hold and off intervals of the welding operation. The Sequence Timer also includes a squeeze network SN for timing the squeeze operation, a weld network WN for timing the weld operation, a hold network HN for timing the hold operation and an off network ON for timing the off operation. The Sequence Timer further includes a plurality of auxiliary thyratrons AT1, AT2, AT3, AT4, AT5 and AT6, and a plurality of auxiliary time constant networks AN3, AN4, AN5, AN6 and AN7. In addition, the Sequence Timer includes a transformer T5 having a primary P5 and a plurality of secondaries 1S5, 2S5 and 3S5 and another transformer T6 having a primary P6 having an intermediate tap and a secondary S6. Further, the Sequence Timer includes a series network of a resistor 131 and a capacitor 133 which is connected between the conductors AL1 and AL2. The primary P5 is connected between the junction of the resistor 131 and the capacitor 133 and the intermediate tap of the primary P6. The resistor 131 and the capacitor 133 are of the same order of impedance, and a potential leading the potential between the conductors AL1 and AL2 in phase in accordance with the relationship between the resistor 131 and the capacitor 133 is impressed on the primary P5.

The squeeze thyratron ST has an anode 135, a cathode 137, a first control electrode 139 and a second control electrode 141. The anode 135 is connected to the conductor AL1 through the exciting coil of a starting relay RES. The cathode 137 is connected directly to the conductor AL2. The off network ON includes a timing capacitor 151 shunted by a variable resistor 153 and a fixed resistor 155. The variable resistor 153 may be shunted out by a contact 157 of the repeat-non-repeat switch RNR in the non-repeat position of the switch. The first control electrode 139 is connected to the cathode 137 through a grid resistor 161, another resistor 163, the secondary 3S5 of the transformer T5 and the off network ON. The resistor 163 and the secondary 3S5 are shunted by a third resistor 165. The network AN3 includes a capacitor 171 shunted by a pair of fixed resistors 173 and 175 having a center connection so that they operate as a voltage divider and another fixed resistor 177. This network AN3 has a time constant of the order of one period of the supply. The second control electrode 141 is connected to the cathode 147 through a grid resistor 181, a conductor 183 and the network AN3. The control electrode 141 is also connected to the ON network through a resistor 185 which is connected to the conductor 183. A resistor 187 is connected between the anode 135 and the cathode 137. This resistor operates to assure that the coil of the relay RES is de-energized.

The weld thyratron WT includes an anode 195, a cathode 197, a first control electrode 199 and a second control electrode 201. The anode 195 is connected directly to the conductor AL3 and through the coil of the relay RE2 and contacts 103 to the conductor AL1. The anode 195 is also connected to the conductor AL1 through the rectifier 203, the resistor 57 and the network AN1. The cathode 197 is connected to conductor AL2, and through rectifier 203 and network AN2.

The rectifier 203 is poled to conduct the current flowing through the weld thyratron WT, but to block current flow in the opposite direction. This rectifier is introduced for the purpose of preventing the coil relay RE2 from discharging networks AN1 and AN2 once they are charged.

When the weld thyratron WT is not conducting, the control electrode 89 of thyratron TT3 is substantially at the potential of the cathode 87 during the half periods when the conductor AL1 is negative relative to the conductor AL2, that is, when the anode 85 of the thyratron TT3 is positive relative to the cathode 87. Thyratron TT3 is then conducting in the absence of conduction of the weld thyratron WT.

The squeeze network SN includes a capacitor 261 shunted by a variable resistor 263 and fixed resistors 265 and 267. A switch is provided for shunting out resistor 265 when the time constant of the network SN is to be low. The squeeze network SN is connected between the contact electrode 199 and the cathode 197 of the weld thyratron WT through the secondary 2S5, a resistor 270 and the grid resistor 267. The secondary 2S5 and the resistor 270 are shunted by another resistor 271. The network AN7 includes a capacitor 221 shunted by a resistor 223 and is connected between the control electrode 201 and the cathode 197 of the weld thyratron WT. The network AN7 has a time constant such that the capacitor when charged and permitted to discharge, discharges sufficiently to permit thyratron WT to conduct in a time interval of the order of one period of the supply AL1–AL2. The hold thyratron HT has an anode 375, a cathode 377 and the control electrode 379. The anode 375 of the thyratron AT5 is connected to the conductor AL2 through a current limiting resistor 381 and the network AN7. The cathode 377 is directly connected to the conductor AL1. The control electrode 379 of the thyratron AT5 is connected through a grid resistor 383, the network AN6 and the network WN to the cathode 377. The control electrode 209 is connected to the cathode 207 through a grid resistor 225 and the network AN7.

The off thyratron OT has an anode 385, a cathode 387 and a control electrode 389. The anode is connected to the conductor AL2 through a current limiting resistor 391, a conductor 392 and the off network ON. The cathode 387 is directly connected to the conductor AL1. The control electrode 389 is connected to the cathode 387 through the grid resistor 393, another resistor 395, the secondary 1S5 and the hold network HN. The secondary 1S5 and the resistor 395 are shunted by another resistor 397.

The thyratron AT1 has an anode 295, a cathode 297 and a control electrode 299. The anode 295 is connected to the conductor AL2 through a current limiting resistor 301 and the network AN3. The cathode is connected directly to the conductor AL1. The network AN4 includes a capacitor 251 shunted by a resistor 253. The control electrode 299 is connected to the cathode through a grid resistor 303 and through the network AN4. The network AN4 has a time constant such that if the capacitor 251 is charged and then permitted to discharge, it discharges sufficiently to permit thyratron AT1 to conduct in about one period of the supply.

The thyratron AT2 has an anode 305, a cathode 307 and a control electrode 309. The anode 305 is connected to the conductor AL2 through a current limiting resistor 311 and the squeeze network SN. The cathode 207 is directly connected to the conductor AL1. The control electrode 309 is connected to the cathode 307 through a grid resistor 321 and the network AN4.

The thyratron AT3 has an anode 235, a cathode 237, a first control electrode 239 and a second control electrode 241. The anode 235 is connected to the conductor AL1 through a current limiting resistor 255 and the network ANr. The cathode 237 of the thyratron AT3 is connected to the conductor AL2.

The first control electrode 239 of the off thyratron is connected to its cathode 237 through the contact 281 of the switch RNR when it is in the repeat position, through the grid resistor 161, the network including the secondary 3S5 and the off network ON. The second control electrode 241 is connected through a grid resistor 285 to the junction of the resistors 173 and 175 and thus to the time constant network AN3. This junction of the resistors 173 and 175 is connected through the pressure switch ASP to the conductor 183. When the pressure switch is closed and the network AN3 is charged, the negative potential impressed on the control electrodes 141 of the squeeze thyratron is higher than with the switch open.

The thyratron AT4 has an anode 325, a cathode 327 and control electrode 329. The network AN5 includes a capacitor 331 shunted by a fixed resistor 333 and the secondary HS3 of the transformer HT3 which supplied heating current to the cathode heater of thyratron. The anode 325 is connected to the conductor AL1 through a current limiting resistor 335 and the network AN5. The cathode is directly connected to the conductor AL2. The control electrode 329 of thyratron AT3 is connected to its cathode 327 through the grid resistor 269, the network including the secondary 2S5 and the resistors 270 and 271 and the squeeze network SN.

The thyratron AT5 has an anode 345, a cathode 347 and a control electrode 349. The weld network WN includes a capacitor 351 shunted by variable resistors 353 and 355 and a fixed resistor 357. Where a short weld time is desirable, the resistor 355 may be shunted out by a switch 359. The network AN6 includes a capacitor 361 shunted by a portion of the voltage divider 363, a resistor 365 and another resistor 367. The thyratron AT5 is supplied with anode potential from the secondary S6. The anode 345 of thyratron AT4 is connected to one terminal of secondary S6 through a current limiting resistor 371. The other terminal of secondary S6 is connected to the cathode 347 of thyratron AT4 through the network WN. The network AN6 is connected across the secondary S6 through the remaining portion of the voltage divider 363. The control electrode 349 of the thyratron AT4 is connected to its cathode through a grid resistor 373 and through the network AN5.

The thyratron AT6 has an anode 205, a cathode 207 and a control electrode 209. The network HN includes a capacitor 211 shunted by a variable resistor 213 and a fixed resistor 215. The anode 205 is connected to the conductor AL1 through a current limiting resistor 217 and the network HN. The cathode 207 is connected to the conductor AL2.

The thyratrons ST, WT, AT3, AT4 and AT6 are supplied with cathode heating potential through secondary HS4 of a transformer HT4 and a resistor 401. The heaters of the other thyratrons AT1, AT2, AT5, HT and OT are supplied directly from corresponding secondaries (not shown except for HS3) of heater transformers. When the power is first applied to the Sequence Timer, the cathodes of the thyratrons ST, WT, AT3, AT4 and AT6 for this reason reach a temperature at which the thyratrons are capable of conducting about one cycle after the thyratrons AT1, AT2, AT5, HT and OT.

*Fig. 1—Standby*

The standby condition of the apparatus is defined as the condition in which the apparatus is ready to produce a weld, but is not in actual operation. In discussing the standby condition of the apparatus, it will be assumed that the switch RNR is set in the repeat position with the contact 281 closed and the contact 157 open as shown. It will also be assumed that the Slope Control Unit is to be in operation and that the switch SW1 is closed as shown.

During the standby condition of the apparatus, the conductors L1, L2, AL1, AL2, DL1 and DL2 are energized. When the supply conductors AL1 and AL2 are first energized, the time constant networks AN1 through AN6 and the networks SCN, SN, WN, ON and HN are discharged. Anode-cathode potential is immediately supplied to the thyratrons ST, WT, AT3, AT4 and AT6, but even if this anode potential happens to be positive, these thyratrons fail to conduct for a time interval of the order of one period of the supply because their cathodes do not reach a temperature sufficient for conduction for this interval after the power is applied. Anode-cathode potential is also supplied to thyratrons AT1, AT2, AT5 and HT and OT. Since the heaters of the cathodes of these thyratrons do not include a resistance, these thyratrons are capable of conducting before the others.

Accordingly, thyratrons AT1 and AT2 conduct when their anode-cathode potentials become positive. The conduction of thyratron AT1 charges the network AN3 and the conduction of thyratron AT2 charges the squeeze network SN. The charge on the network AN3 impresses a small blocking potential between the second control electrode 141 and the cathode 137 of the thyratron ST. The latter then does not conduct when its cathode reaches adequate temperature for conduction, and its anode-cathode potential becomes positive. The charging of network AN3 also impresses a blocking potential between the control electrode 241 and the cathode 237 of the thyratron AT3 so that the latter is prevented from conducting. The potential ON control electrode 241 is more negative than the potential on control electrode 141 because the former is connected to the junction of resistors 173 and 175 and the latter to resistor 175 (switch SP being open). Because the squeeze network SN is charged, a blocking potential is impressed between the control electrode 199 and the cathode 197 of the weld thyratron WT and also between the control electrode 329 and the cathode 327 of the thyratron AT4. The latter are then also maintained non-conducting. The network AN5 is then uncharged and thyratron AT5 conducts. The network WN is then charged, and it impresses a blocking potential between the control electrode 379 and the cathode 377 of the thyratron HT blocking the latter. The network AN7 is then uncharged and the thyratron AT6, one it can conduct, conducts to charge network HN. Since the control electrode 389 of thyratron OT is connected to network HN, this thyratron OT is non-conducting.

Because thyratron WT is non-conducting, the network AN2 is uncharged and thyratron TT3 is conducting. The latter charges the network SCN which impresses a blocking bias between the control electrode 89 and the cathode 87 of the thyratron TT2. The latter is then non-conducting and the transformer T4 is quiescent. The thyratron TT1 is then maintained non-conducting by the bias on capacitor 91.

Because the thyratron WT is non-conducting, the relay RE2 is deenergized, its contact 77 is closed and its contact 73 is open. Relay RE1 is then actuated through contacts 77 and 407, and its contact 71 is closed connecting the resistor RU in circuit with the input windings WI-1 and WI-2 of the magnetic amplifiers MA1 and MA2. The impedance of the output windings WO1 and WO2 of the magnetic amplifiers MA1 and MA2 then depends on the resistance of the resistor RU, and since this resistor is relatively high, the impedance is relatively high. Under these circumstances, the potential delivered by the secondary OS of the transformer OT in the control circuits of the thyratrons HCT1 and HCT2 occurs late in the periods of the supply, and if these thyratrons could conduct, they would conduct late in the half periods of the supply and fire the corresponding ignitrons I-1 and I-2 late in the half periods so that the low current corresponding to the start of the rise component of the weld impulse would be supplied.

As a matter of fact, the thyratrons HCT1 and HCT2 are not conducting because they must conduct through the thyratron HCT3 and the latter is maintained non-conducting by the bias in the control circuit. This bias can be counteracted by the potential on network AN1, but this network is at this time uncharged because the weld thyratron WT which supplies the charge is non-conducting. Thus, potential is not supplied through the transformer CT to fire the firing thyratrons FT1, and these thyratons and the ignitrons I-1 and I-2 are non-conducting.

In addition, the relay RES is deenergized and its contact 403 is open so that the solenoid SV is deenergized and the valve V closed. The electrode VI is then retracted from the electrode E2 and switch SP is open.

*Fig. 1.—Operation*

To start a welding operation, the work Z is inserted between the electrodes E1 and E2 and the start switch SS is closed. By the closing of the start switch, the small negative bias impressed on the control electrode 141 of the squeeze thyratron ST by the network AN3 is shorted out and the thyratron ST conducts. The conduction of this thyratron causes relay RES to be actuated and contact 403 is closed. Valve solenoid SV is then actuated to open valve V and permit pressure to be applied to move the electrode E1 into engagement with the work. The electrode is moved in this manner and pressure is applied to the work.

The closing of the stop switch SS also connects the control electrode 241 of thyratron AT3 to the cathode 23 through the grid resistor 285 and the resistor 175. Initially, back pressure switch SP is open and so long as this switch is open, resistor 175, since it conducts discharge current from the capacitor 171, impresses a small blocking bias between the control electrode 241 and the cathode 237 of thyratrons AT3. But when the electrode E1 has engaged the work Z and adequate pressure has been built up, the switch SP is closed connecting the control electrode 241 through the grid resistor 285 to the more positive side of resistor 175. Thyratron AT3 now conducts, locking in the operation so that it proceeds regardless of the position of the start switch SS.

The conduction of thyratron AT3 charges network AN4 so that thyratrons AT1 and AT2 are rendered non-conducting. When thyratron AT1 stops conducting, the charging of network AN3 is stopped and the latter immediately discharges, assuring that thyratrons ST and AT3 continue to conduct. When thyratron AT2 stops conducting, the charging of network SN is stopped and this network times out. At the end of the squeeze interval, the network SN has discharged sufficiently to permit thyratrons WT and AT4 to conduct. The conduction of thyratron WT produces a welding pulse, and this phase of the operation will now be considered.

The conduction of thyratron WT causes the network AN1 to charge through the rectifier 203 and the resistor 57 in a sense such that the bias in the control circuit of thyratron HCT3 is counteracted, and this thyratron may now conduct. Thyratrons HCT1 and HCT2 may now also conduct, but the angle at which they are fired is determined by the initial impedance of the windings WO1 and WO2 and, initially, these thyratrons conduct late in their corresponding half periods of the supply as determined by the resistor RU which is initially connected to supply current to the input windings WI1 and WI2. During the early parts of the positive half periods of anode-cathode potential supplied to thyratrons HCT1 and HCT2, thyratron HCT3 is maintained conditioned to conduct by the network AN1. Late in the positive half periods of the potentials supplied to thyratrons HCT1 and HCT2 when these thyratrons are fired and conduct current through thyratron HCT3, which is still conditioned to conduct, the potential impressed through the transformer CT is adequate to fire the thyratrons FT1 and FT2, and the ignitrons I–1 and I–2, respectively, are correspondingly fired. Small current corresponding to the beginning of the rise component of the welding pulse is now supplied to the primary P of the welding transformer.

The weld thyratron WT also supplies current to the coil of the relay RE2, actuating the latter. The contact 77 is then opened and the contact 73 closed. The opening of contact 77 drops out relay RE1 which opens contact 71. The current flow through the windings WI1 and WI2 is now determined by the resistor RW which is smaller than the resistor RU.

As the current through the windings WI1 and WI2 increases from the magnitude determined by the resistor RU to the magnitude determined by the resistor RW, potential is induced in the control windings WC1 and WC2 and the decay of this potential is determined by the resistor RDU in series with the rectifier X1. Depending on the magnitude of this potential, the decay may take place at a low or high rate. Whatever the rate, it determines the rate at which the current flow through the windings WI1 and WI2 increases from the magnitude corresponding to the resistor RU to the magnitude corresponding to the resistor RW.

As the current flow through the windings WI–1 and WI–2 increases, the impedance of the windings WO1 and WO2 decreases. The phase lag between the potential impressed between the anodes and cathodes of the thyratrons HCT1 and HCT2 decreases, and the thyratrons HCT1 and HCT2 are fired earlier and earlier in the half periods of the supply. The ignitrons I–1 and I–2 are then also fired gradually earlier in the half periods of the supply, and the current flow through the primary P of the welding transformer W increases from the low initial magnitude to the welding magnitude.

The conduction of thyratron WT also causes the capacitor 125 in the control circuit of thyratron TT3 to charge to such a potential that the thyratron TT3 is rendered non-conducting. The charging of network SCN is interrupted and this network begins to time out. For the present, there is no change in the operation as just described. The rise component and the weld component of the welding pulse are produced during this time. At the end of the time interval set by networks SCN, the latter times out permitting thyratron TT2 to conduct. This thyratron now conducts actuating relay RE3.

The actuation of relay RE3 causes contact 75 to close and contacts 405 and 407 to open. At contact 75 resistor RD is connected in circuit with the input windings WI–1 and WI–2 of the magnetic amplifiers MA1 and MA2. Relay RE2 is deenergized at contact 403 so that it drops out opening contact 73. At the contact 407, the actuation of relay RE1 is prevented.

The resistor RD is of a higher magnitude than the resistor RW, and the current flow through the windings WI–1 and WI–2 now tends to decrease. As the current decreases, potential is induced in the windings WC3 and WC4, and current flows through the resistor RDD and the rectifier X2. This current flow determines the rate at which the current flow from the windings WI–1 and WI–2 decreases from the magnitude corresponding to resistor RW to the magnitude corresponding to the resistor RD. As this current flow through the windings WI–1 and WI–2 decreases at the rate determined by resistor RDD, the reactance of windings WO1 and WO2 correspondingly decreases. The lag in phase of the potential supplied by the secondary OS with reference to the anode cathode potential of the thyratrons HCT1 and HCT2 is not correspondingly increased, the current flow through the ignitrons I–1 and I–2 correspondingly decreased. This current flow continues to decrease until it reaches the magnitude corresponding to constant current flow to the windings WI1 and WI2, and at this point, the current flow through the primary P has the magnitude at which the decay current of the welding pulse stops.

While the above-described portion of the operation was taking place, the operation of the Sequence Timer progressed. Thyratron AT4 which had been rendered conducting simultaneously with the thyratron WT charged the network AN5. This caused the thyratron AT5 to be rendered non-conducting and to permit the weld network WN to time out. The above-described operation of the Slope Control Unit and the Power Supply Unit took place while the network WN was timing out.

At the end of the weld time, the network WN is sufficiently discharged to permit the hold thyratron HT to conduct. The conduction of the latter charges network AN7. Network AN7 impresses a bias on the control electrode 195 on the thyratron WT to render this thyratron non-conducting. At this point, the Power Supply Unit and the Slope Control Unit must again be considered.

When thyratron WT becomes non-conducting, the charging of network AN2 is interrupted, and it discharges in a short time interval of the order of one period of the supply sufficiently to permit thyratron TT3 to become conducting. Network SCN is then charged and renders thyratron TT2 non-conducting. The conduction of thyratron TT1 is then stopped and relay RE3 drops out. Relay RE1 is now energized through contacts 77 and 407. Relay RE2 remains deenergized because thyratron WT is non-conducting. The Slope Control Unit is now reset for another operation. In addition, because thyratron WT is non-conducting, the charging of network AN1 is stopped and thyratron HCT3 becomes non-conducting. The supply of firing pulses by the Heat Control Unit is interrupted and the supply of current to the primary P of the welding transformer W is stopped. Since the squeeze thyratron ST is still conducting, contact 403 remains closed and the valve V remains open so that the electrode E1 remains in engagement with the work Z.

In the Sequence Timer, the charging of the network AN7 also renders non-conducting the thyratron AT6, stopping the charging of the network HN. This network now times out during the hold time, and at the end of the hold time, permits the off thyratron OT to conduct. The off thyratron OT now charges the off network ON and blocking potentials are impressed on the control electrode 239 of the thyratron AT3 and on the control electrode 139 of the thyratron ST. Thyratrons AT3 and ST are now rendered non-conducting.

Because thyratron ST is non-conducting, relay RES drops out opening contact 403 and closing valve V so that the electrode E1 is retracted from the work. The weld is now completed, and the work Z may be advanced for another weld or another component of work may be inserted between the electrodes.

When thyratron AT3 is rendered non-conducting, network AN4 discharges permitting thyratrons AT1 and AT2 to conduct. Networks AN3 and SN are now recharged or reset for another operation. By the charging of network SN, thyratron AT4 is rendered non-conducting, interrupting the charging of network AN5 and permitting thyratron AT5 to conduct. Network WN is now charged and reset for a new operation. In addition, thyratron HT is rendered non-conducting, permitting network AN7 to discharge so that thyratron AN6 may again conduct. Network HN is now charged and reset for another operation, and thyratron OT is rendered non-conducting. Network ON may be discharged and be reset for a new operation. The discharge of network ON does not affect the operation of thyratrons ST and AT3 unless switch SS is closed. If it is, the above-described operation is repeated with the difference that this time thyratrons 151 and AT3 are rendered conducting by potentials impressed on their centive electrodes 179 and 239 rather than on the electrodes 141 and 241.

It may be well at this point to consider the effect of transformer T5 and of network AN5 on the operation of the apparatus. The secondaries 1S5, 2S5 and 3S5 impress ripples in the control circuits of thyratrons OT, WT and AT4, and ST and AT3 which lead the corresponding anode potentials in phase thyrartons OT, WT, ST, AT3 and AT4 are thus fired at the beginning of the positive half periods of the supply and the operation is positive. Network AN5 includes secondary HS3 which introduces a ripple into the control circuit of thyratron AT5 which lags the corresponding anode potential in place. This delays the firing of thyratron AT5 sufficiently to enable thyratron AT4 to block thyratron AT5 during the first half period during which AT4 is fired. This operation permits the Sequence Timer to time a weld having a duration of one period.

It is seen that with the above described apparatus a welding impulse suitable for high precision welding having a predetermined rise component, a predetermined weld component and a predetermined decay component is produced. This impulse is produced with apparatus which does not involve the complexity of the apparatus disclosed in the Large application.

Modification

In Figs. 2, 3 and 4, the important features of the modifications of our invention are shown. In each case, only the magnetic amplifiers and a few associated components are included.

The modification shown in Fig. 2 shows a magnetic amplifier circuit including magnetic amplifiers MA1 and MA2 such as are included in the modification shown in Fig. 1. But in this case the output windings WO1 and WO2 are connected in parallel in circuit with the phase shifting resistor RP and the secondary S3 of the transformer T3. The impedance of the windings WO1 and WO2 in this case is equal to the product of the impedances of each of the windings divided by their sum and is substantially smaller than the impedance in the case in which the windings WO1 and WO2 are connected in series aiding as in the Fig. 1 apparatus.

The modification shown in Fig. 3 is similar to the modification shown in Fig. 2 except that in this case, rectifiers X3 and X4 are connected between the common conductors 407 and 409 which lead, respectively, to the secondary S3 and the resistor RP and the output windings WO1 and WO2. The rectifiers X3 and X4 are oppositely connected so that during the half periods when conductor 407 is positive relative to conductor 409, rectifier X4 conducts through winding WO2, and during the other half periods, rectifier X3 conducts through winding WO1. The effect of the rectifiers is to produce a self-saturating effect on the cores C1 and C2, respectively, and thus to produce a sharp change in the impedance of the magnetic amplifiers MA1 and MA2 in response to a change in the current flow through the input windings WI1 and WI2.

The apparatus shown in Fig. 4 includes magnetic amplifiers 1MA1 and 1MA2, each of which has only three windings, an output winding 1WO1 and 1WO2, an input winding 1WI1 and 1WI2 and only one control winding 1WC1 and 1WC2. Across the control windings, the networks for controlling the rate of rise and the rate of decay of the welding pulse are connected in parallel. The former network includes the variable resistor 1RDU and the rectifier 1X1, and the other includes the variable resistor 1RDD and the rectifier 1X2. The rectifiers 1X1 and 1X2 are oppositely connected, the former conducting the current induced in the control windings 1WC1 and 1WC2 when the current flow through the input windings 1WI1 and 1WI2 is increased and the latter conducting the current induced in the windings 1WC1 and 1WC2, when the current in the input windings 1WI1 and 1WI2 is decreased.

The magnetic amplifier circuits shown in Figs. 2, 3 and 4 are connected to the Sequence Timer, the Timing Circuit, the Heat Control Unit and the Power Supply Unit in the same manner as the Magnetic Amplifier Circuit of the Fig. 1 embodiment and operate in much the same way.

Conclusion

While we have shown and described certain specific embodiments of our invention, many modifications thereof are possible. Our invention, therefore, is not to be limited except insofar as is necessitated by the spirit of the prior art.

We claim as our invention:

1. In combination magnetic amplifier means having output winding means, input winding means and control winding means, means connected to said input winding means for supplying direct current variable at the will of an operator to said input winding means, first rectifier means, second rectifier means, a first closed network including said control winding means and said first rectifier means, and a second closed network including said control winding means and said second rectifier means, said first rectifier means being poled to conduct only the current induced in said control winding means when said direct current is increased and said second rectifier means being poled to conduct only the current induced in said control winding means when said direct current is decreased.

2. In combination magnetic amplifier means having output winding means, input winding means and control winding means, means connected to said input winding means for supplying direct current variable at the will of an operator to said input winding means, first rectifier means, second rectifier means, a first closed network including said control windings means and said first rectifier means, a second closed network including said control winding means and said second rectifier means, said first rectifier means being poled to conduct only the current induced in said control winding means when said direct current is increased and said second rectifier means being poled only to conduct the current induced in said control winding means when said direct current is decreased, alternating current power supply means having terminal taps and an intermediate tap, a resistor having an impedance of the same order as that of said output winding means, means for connecting in series said terminal taps, said resistor and said output winding means, and means for deriving a potential between said intermediate tap and the junction of said resistor and said output winding means.

3. In combination magnetic amplifier means having output winding means, input winding means and control winding means, means connected to said input winding means for supplying direct current variable at the will of an operator to said input winding means, first rectifier means, second rectifier means, a first closed network including said control winding means and said first rectifier means, a second closed network including said control winding means and said second rectifier means, said first rectifier means being poled only to conduct the current induced in said control winding means when said direct current is increased and said second rectifier means being poled only to conduct the current induced in said control winding means when said direct current is decreased, alternating current power supply means having terminal taps, a resistor having an impedance of the same order as that of said output winding means, and means for connecting in series said terminal taps.

4. In combination a first magnetic amplifier having an input winding, an output winding and control winding means, a second magnetic amplifier having an input winding, an output winding and control winding means, means for connecting said output windings in series aiding, direct current supply means, means for connecting in series said direct current supply means, said input winding of said first amplifier and said input winding of said second amplifier, said input windings being connected opposing with respect to potential induced into each said input winding by current flow through the corresponding output winding, first rectifier means, second rectifier means, a first closed series network including said control winding means of said first amplifier, said control winding means of said second amplifier and said first rectifier means, and a second closed series network including said control winding means of said first amplifier, said control winding means of said second amplifier and said second rectifier means, said control winding means being connected opposing to potential induced in each control winding means by current flowing in the corresponding output winding.

5. In combination a first magnetic amplifier having an input winding, an output winding and control winding means, a second magnetic amplifier having an input winding, an output winding and control winding means, means for connecting said output winding in series aiding, direct current supply means, means for connecting in series said direct current supply means, said input winding of said first amplifier and said input winding of said second amplifier, said input windings being connected opposing with respect to potential induced into each said input winding by current flow through the corresponding output winding, and means connecting said first control winding means and second control winding means in series opposing with respect to potential induced in each said winding means by current flowing in the corresponding output winding.

6. In combination a first magnetic amplifier having an input winding, an output winding and control winding means, a second magnetic amplifier having an input winding, an output winding and control winding means, means for connecting said output windings in series aiding, direct current supply means, means for connecting in series said direct current supply means, said input winding of said first amplifier and said input winding of said second amplifier, said input windings being connected opposing with respect to potential induced into each said input winding by current flow through the corresponding output winding, first rectifier means, second rectifier means, a first closed series network including said control winding means of said first amplifier, said control winding means of said second amplifier and said first rectifier means, and a second closed series network including said control winding means of said first amplifier, said control winding means of said second amplifier and said second rectifier means, said control winding means being connected opposing to potential induced in each control winding means by current flowing in the corresponding output winding, said first rectifier means being poled to conduct the current induced in said control winding means when the current in said input winding increases and said second rectifier means being poled to conduct the current induced in said control winding means when the current in said control winding decreases.

7. In combination magnetic amplifier means having output winding means, input winding means and control winding means, means connected to said input winding means for supplying direct current variable at the will of an operator to said input winding means, first rectifier means, second rectifier means, first variable impedance means, second variable impedance means, a first closed network including said control winding means, said first impedance means and said first rectifier means, and a second closed network including said control winding means, said second impedance means and said second rectifier means, said first rectifier means being poled to conduct only the current induced in said control winding means when said direct current is increased and said second rectifier means being poled to conduct only the current induced in said control winding means when said direct current is decreased.

References Cited in the file of this patent

UNITED STATES PATENTS

| | | |
|---|---|---|
| 2,310,112 | Palmer et al. | Feb. 2, 1943 |
| 2,504,675 | Forssell | Apr. 18, 1950 |
| 2,584,856 | Fitzgerald | Feb. 5, 1952 |
| 2,617,977 | Large | Nov. 11, 1952 |
| 2,780,771 | Lee | Feb. 5, 1957 |

OTHER REFERENCES

"Magnetic Amplifier Circuits and Applications" by R. A. Ramey, Electrical Engineering, September 1953, pp. 791–795.